Sept. 4, 1951  G. H. BARTLETT  2,566,547
COMBINED SCRAPER BLADE AND SCARIFIER
ATTACHMENT FOR TRACTORS
Filed Jan. 10, 1949  3 Sheets-Sheet 1

INVENTOR.
GEORGE H BARTLETT

BY *F.R.Geisler*

ATTORNEY

Sept. 4, 1951  G. H. BARTLETT  2,566,547
COMBINED SCRAPER BLADE AND SCARIFIER
ATTACHMENT FOR TRACTORS
Filed Jan. 10, 1949  3 Sheets-Sheet 2
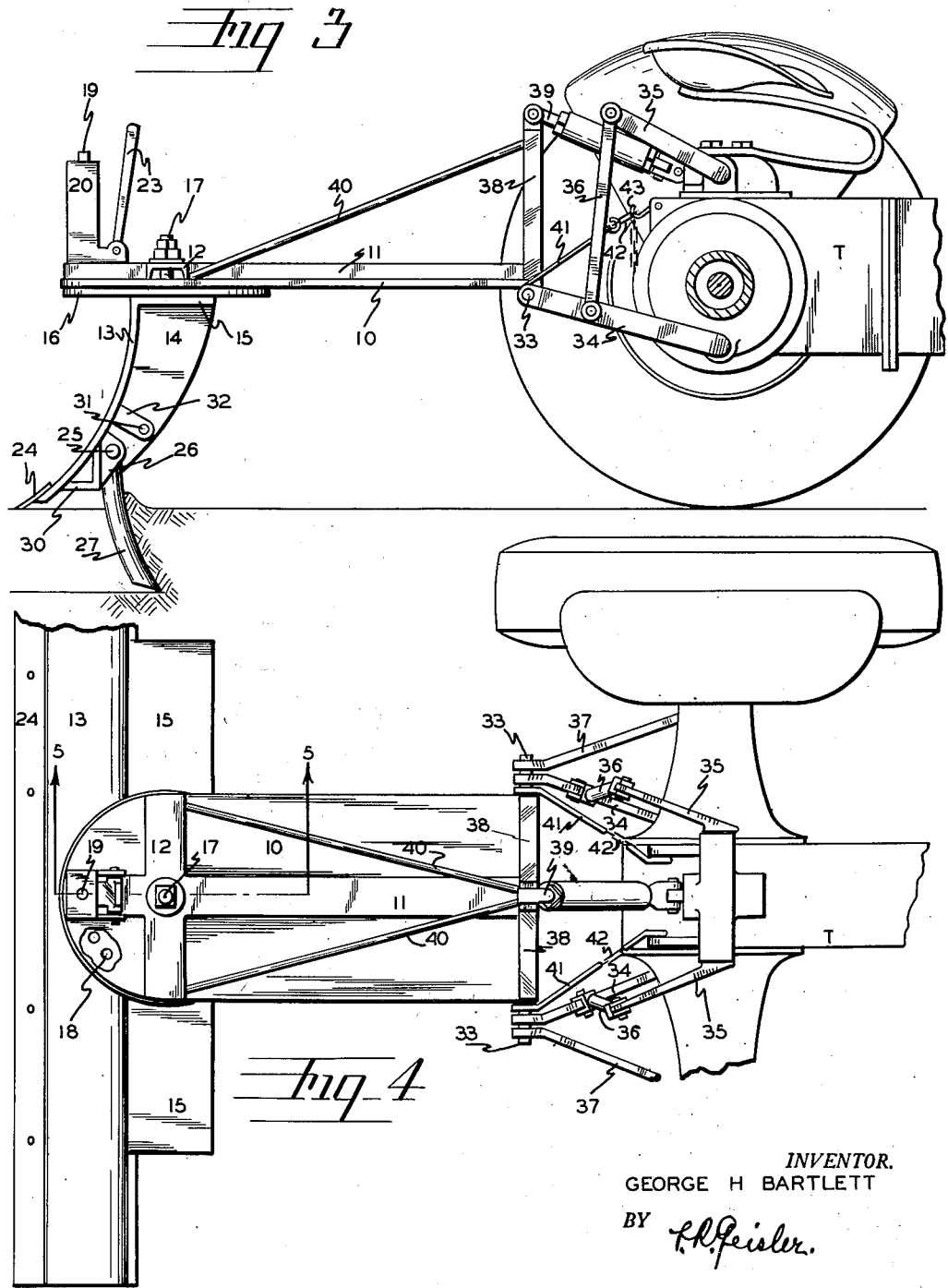
INVENTOR.
GEORGE H BARTLETT
BY
ATTORNEY Sept. 4, 1951 G. H. BARTLETT 2,566,547
COMBINED SCRAPER BLADE AND SCARIFIER
ATTACHMENT FOR TRACTORS
Filed Jan. 10, 1949 3 Sheets-Sheet 3
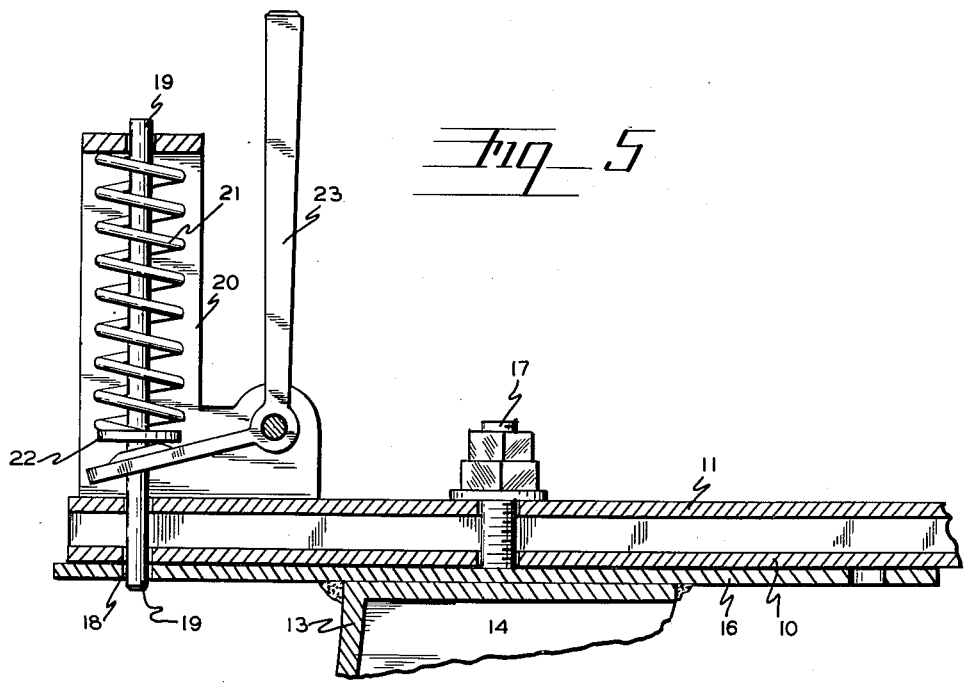
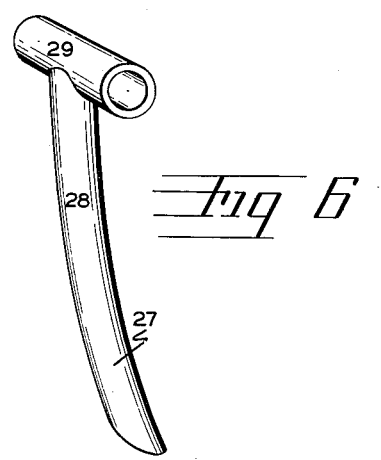
INVENTOR.
GEORGE H BARTLETT
BY
ATTORNEY Patented Sept. 4, 1951

2,566,547

UNITED STATES PATENT OFFICE 2,566,547

COMBINED SCRAPER BLADE AND SCARIFIER ATTACHMENT FOR TRACTORS

George H. Bartlett, Vancouver, Wash.

Application January 10, 1949, Serial No. 70,077

1 Claim. (Cl. 37—145)

This invention relates in general to scrapers, graders, bull-dozers, scarifiers, and the like, and, more specifically, to tractor attachments which are capable of performing such ground working operations.

An object of this invention is to provide an improved attachment for a tractor by means of which attachment several different ground working operations, such as scraping, grading, ditching, back-filling, grubbing, etc., can be selectively performed merely by adjusting the attachment to suit the type of ground work to be performed.

Another object of this invention is to provide an improved ground working tractor attachment which will be capable of several adjustments to correspond to the type of ground work to be performed, but which adjustments can be very easily, simply and quickly made.

A further object of this invention is to provide an improved device of the type above indicated which will be suitable for attachment to an ordinary tractor, which will be simple and practical to manufacture and thus capable of being made available to the market at moderate cost, and which can be used in many instances in place of more elaborate and more expensive ground working equipment.

The means by which, and the manner in which, these general objects and other advantages are attained through my improved tractor attachment will be explained briefly with reference to the accompanying drawings in which:

Fig. 1 is a side elevation of my tractor attachment illustrating the attachment adjusted for the performance of ground scraping, leveling and the like;

Fig. 2 is a rear elevation of the same;

Fig. 3 is a side elevation similar to Fig. 1 but showing my tractor attachment adjusted for such work as scarifying, grubbing and the like;

Fig. 4 is a fragmentary plan view of the tractor attachment when adjusted as shown in Fig. 3;

Fig. 5 is a vertical section taken on line 5—5 of Fig. 4 but drawn to a larger scale; and Fig. 6 is a perspective view, on an enlarged scale, of one of the scarifier teeth with which my tractor attachment is equipped.

Figures 1, 2:
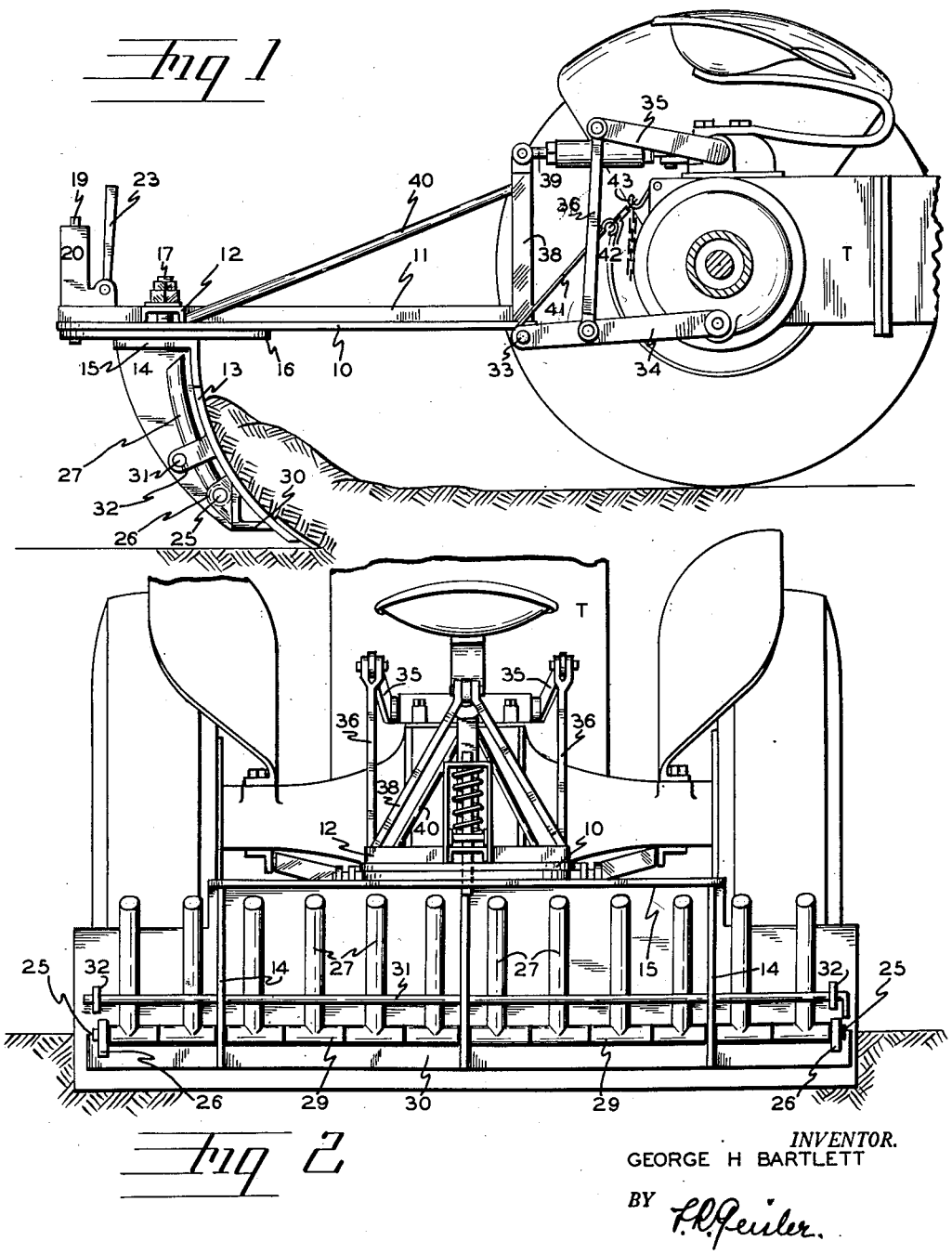

Referring first to Figs. 1 to 4 inclusive, my tractor attachment includes a main body plate 10, which I designate as a platform plate, to which platform plate the blade assembly is adjustably attached, and which platform plate in turn is adjustably connected to the tractor by means which will be briefly described later. The platform plate 10 is made of suitably heavy metal and is preferably reinforced by a central longitudinally-extending channel rib 11 and a cross rib 12 extending across the platform plate near the rear, as shown most clearly in Fig. 4. The platform plate 10 is substantially rectangular in shape except that the rear end is made semi-circular.

An adjustable blade assembly includes a ground-working blade 13 formed with the usual concave face and reinforced with vertical ribs 14 on its opposite face. The blade 13 and ribs 14 are welded to a rectangular top plate 15 above which in turn is secured a central circular mounting plate 16 (Figs. 1 and 3), of substantially the same diameter as the semi-circular end of the platform plate 10. This blade assembly is rotatably mounted on the underside of the platform plate 10 by a center king pin bolt 17 extending through the center of the circular mounting plate 16 and correspondingly through the center of curvature of the rear portion of the platform plate above the blade assembly mounting plate.

The circular mounting plate 16 of the blade assembly is provided with a circular row of holes 18 (Fig. 4) each of which is arranged for engagement by a spring-actuated locking pin 19 which normally extends down through a hole in the platform plate 10 and through a hole in the center rib 11 so as to engage one of the holes 18 in the circular mounting plate 16. This locking pin 19 is shown in detail in Fig. 5. The locking pin 19 is slidably mounted in a housing 20 and a coil spring 21, held under compression between the inside face of the top of the housing 20 and a washer 22 secured on the locking pin 19, holds the locking pin normally in the locking position illustrated in Fig. 5. A bell crank hand lever 23 is arranged with a birurcated arm for engaging the under side of the washer 22 so that a manual pull on the lever 23 will operate to lift locking pin 19 out of engagement with any of the holes 18 in the circular mounting plate 16 of the blade assembly. Fig. 1 shows the blade assembly locked in one position and Fig. 3 shows the blade assembly in the reverse position. As evident, the blade assembly can also be locked in any intermediate position which may be most suitable for the particular type of work required to be done. The rotation and locking in the desired position of the blade assembly is thus very quickly and easily accomplished.

A detachable and reversible cutting edge strip 24 is secured to the blade 13 near the bottom edge, as shown in Figs. 3 and 4, by suitable screws or bolts and may be easily replaced when damaged or worn.

A shaft 25 extends along the under side of the blade 13 and through the ribs 14, in the approximate location shown in Figs. 1, 2 and 3. The ends of the shaft are mounted in brackets 26 near the side edges of the blade. A plurality of spaced scarifier teeth 27 are rotatably supported on the shaft 25. These teeth are identical and an enlarged view of one of them is shown in Fig. 6. Each tooth consists of a main tooth portion 28, formed from a strong bar of steel or other suitable metal, preferably curved substantially in the manner illustrated in Fig. 6, and attached at its upper end to a sleeve 29 with which it forms a T-shaped connection. The internal diameter of the sleeve portion 29 is only slightly greater than the diameter of the supporting shaft 25 so as to permit the individual teeth to be slid into place on the shaft 25 and then to be rotatably held by the shaft. The length of the sleeve portion 29 preferably corresponds to the desired spacing of the teeth on the blade, in which case no washers or similar spacers are required to be interposed between the consecutive tooth sleeves.

An angle iron rib 30 extends along the under side of the blade 13 parallel to the shaft 25 and in the approximate position with respect to the shaft 25 shown in Figs. 1 and 3. Thus when the scarifier teeth 27 are swung to the lower operating position, as illustrated in Fig. 3, their contact with the transversely-extending rib 30 will cause them to be held in the desired operating position.

A stay rod 31, removably supported at its ends in brackets 32 which are secured to the blade 13 above the tooth supporting shaft 25 (see Fig 2), serves to hold the teeth in the upward inoperative position shown in Figs. 1 and 2. When it is desired to use the teeth in my attachment, for example, in scarifying and grubbing operations, the stay rod 31 is pulled out to allow the teeth 27 to drop down into the operating position of Fig. 2. It will also be apparent from Fig. 2 that some of the teeth can be dropped to operating position and the others held in an upper inoperative position by the stay rod 31 when fewer teeth, or more widely spaced teeth, are preferable for the particular work being done. Thus the teeth as well as the entire blade assembly may be employed arranged in various ways.

The platform plate 10, and therewith my entire attachment, is connected to the tractor by what might be described as an adjustable three-point connection or suspension. A pair of stub shafts 33, rigidly mounted at the inner end of the platform plate 10, extend from opposite sides thereof in alignment with each other. A pair of lift arms 34 have one end pivotally mounted on the stub shafts 33 respectively, and their forward ends pivotally connected to the tractor. A pair of positioning levers 35, mounted on the tractor, and operated individually and independently from the tractor by means not shown, have their rear or outer ends joined by links 36 to the lift arms 34 respectively.

Sway braces 37, similar to the lift arms 34, extend from the stub shafts 33 to pivotal mountings further out on the tractor in general alignment with the pivotal mountings for the forward ends of the lift arms 34. For example, these are preferably connected to points further out on the rear axle housing of the tractor. These sway braces hold the attachment firmly against side pulls which would otherwise place a strain on the lift arms 34.

A pair of bracket arms 38, the lower ends of which are rigidly secured to the forward end of the platform plate 10 at the sides, support a central mounting for a telescoping link 39 at their upper ends. Tie bars 40 also connect this mounting to the ends of the rear cross rib 12 of the platform plate 10, and thus combine with the bracket arms 38 to form a rigid mounting support. The telescoping link 39 is connected either through manually operable or hydraulically operable mechanism and means to the upper part of the tractor as indicated in Figs. 1 and 3.

As will be apparent, this three-point mounting enables the platform plate 10, and with it the blade assembly, to be supported in various relative positions with respect to the tractor T. Thus the platform plate 10 may be tipped laterally to either side by the operation of the levers 35, and the rear end of the platform plate 10 may be raised or lowered by operation of the mechanism controlling the telescoping link 39.

As an extra means for holding the platform plate 10 firmly in any position to which it may be set by the levers 35 I provide a pair of holding links 41 and chains 42, which I designate as depth chains, which extend from the stub shafts 33 to anchoring hooks 43 provided on the tractor, as indicated in Figs. 1 and 3. These holding links and depth chains act to secure the platform plate 10 in any laterally tipped position desired and thereby hold the blade 13 to the proper depth on the side to which the platform plate 10 is tipped.

The adjustments possible in the positioning of the platform plate 10, combined with the various ways in which the blade assembly 13 may be turned with respect to the line of travel of the tractor, enable my attachment to be employed for a variety of uses, only a few of which need be mentioned as examples. Thus the blade 13 may be positioned at right angles to the line of travel of the tractor with both sides of the blade at the same depth, and arranged in this manner for performing a scraping or leveling action. Or the blade 13 may be arranged at any position of angularity with the direction of travel of the tractor and at the same time one side of the blade held lower or to a greater working depth than the other. The blade assembly may be rotated through 180° or more, and the device then may even be used in the manner of a bull-dozer with the backing of the tractor. And finally the number of uses is increased further by the employment of the scarifier teeth as previously mentioned.

Minor modifications could be made in my tractor attachment within the scope of my invention. The shape and construction of the adjustable scarfier teeth could be changed. However, the form in which these teeth are shown in the drawings, with the main tooth portion made of uniform diameter and with a T-shaped connection with the mounting sleeve, I consider to be the preferred tooth form because in this form the teeth can be easily and inexpensively manufactured, are easily replaceable and have proven very satisfactory in actual practice.

I claim:

A ground-working attachment of the character described for a tractor including a platform plate having a semi-circular rear portion, means for adjustably attaching said platform plate to the tractor and for tilting said platform plate laterally and longitudinally with respect to the horizontal plane of travel of the tractor, said means including a pair of lift arms connecting the forward end of said platform plate with the tractor, a pair of positioning levers for raising or lowering said lift arms respectively, and separately adjustable holding elements extending from the sides of said platform plate obliquely upwardly to the tractor for holding said platform plate in the desired laterally-tilted position, a blade assembly rotatably mounted below the semi-circular rear portion of said platform plate, a circular top plate on said blade assembly pivotally connected at its center to said platform plate, a plurality of holes in said top plate extending in a circular path around said pivotal connection, a spring-controlled vertically positioned locking pin on the rear of said platform plate for engagement with said holes in said top plate, a lever mounted on the top of said platform plate for temporarily lifting said pin out of engagement with said holes in said top plate, a ground-working blade in said blade assembly, a plurality of demountable scarifier teeth mounted on said blade to swing up and down, a mounting shaft for said teeth extending along said blade, said teeth pivoted on said shaft and a stay rod for selectively holding said teeth in raised inoperative position on said blade, whereby various adjustments in the position of said attachment and in the position of said blade in said attachment can be made to suit the work required with optional use of any or all of said teeth.

GEORGE H. BARTLETT.

REFERENCES CITED

The following references are of record in the file of this patent:

UNITED STATES PATENTS

| Number | Name | Date |
|---|---|---|
| 454,048 | Houser | June 16, 1891 |
| 902,139 | Eady | Oct. 27, 1908 |
| 1,856,148 | Ball | May 3, 1932 |
| 2,081,192 | Allin et al. | May 25, 1937 |
| 2,219,160 | White | Oct. 22, 1940 |
| 2,262,415 | Williams et al. | Nov. 11, 1941 |
| 2,346,757 | Horner | Apr. 18, 1944 |
| 2,463,169 | Grewe | Mar. 1, 1949 |